(12) United States Patent
Kim et al.

(10) Patent No.: US 7,428,288 B2
(45) Date of Patent: Sep. 23, 2008

(54) ASYNCHRONOUS TRANSPORT STREAM RECEIVER OF DIGITAL BROADCASTING RECEIVING SYSTEM EMPLOYING DVB-ASI MODE AND METHOD FOR TRANSMITTING ASYNCHRONOUS TRANSPORT STREAM THEREOF

(75) Inventors: Yong-Deok Kim, Seoul (KR); Jun-Ho Koh, Suwon-shi (KR); Sang-Ho Kim, Suwon-shi (KR); Kyu-Hyung Cho, Puchon-shi (KR); Yun-Je Oh, Yongin-shi (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 786 days.

(21) Appl. No.: 10/681,951

(22) Filed: Oct. 9, 2003

(65) Prior Publication Data

US 2004/0234019 A1 Nov. 25, 2004

(30) Foreign Application Priority Data

May 21, 2003 (KR) .................. 10-2003-0032345

(51) Int. Cl.
*H04L 25/10* (2006.01)
(52) U.S. Cl. ..................... 375/372; 375/371
(58) Field of Classification Search ......... 375/371–376, 375/226, 240.28; 370/503, 414, 395.64, 370/498, 516, 370; 725/63, 67; 348/512, 348/513
See application file for complete search history.

(56) References Cited

U.S. PATENT DOCUMENTS

| | | | | |
|---|---|---|---|---|
| 5,337,334 A | * | 8/1994 | Molloy | ................... 375/372 |
| 5,355,504 A | * | 10/1994 | Nedwek | ................... 712/13 |
| 6,298,387 B1 | * | 10/2001 | Prasad et al. | ............ 375/368 |
| 6,868,091 B1 | * | 3/2005 | Hui et al. | ................ 370/476 |
| 2001/0004366 A1 | * | 6/2001 | Matsumura et al. | .... 375/240.28 |
| 2001/0061023 | * | 8/2001 | Roy et al. | .............. 375/372 |
| 2001/0021227 A1 | * | 9/2001 | Ngai | ................ 375/240.28 |
| 2002/0075980 A1 | * | 6/2002 | Tang et al. | .............. 375/372 |
| 2002/0154640 A1 | * | 10/2002 | Wei | ..................... 370/401 |
| 2002/0172310 A1 | * | 11/2002 | Thamsirianunt et al. | .... 375/371 |
| 2003/0021371 A1 | * | 1/2003 | He | ..................... 375/376 |
| 2003/0028820 A1 | * | 2/2003 | Takashi et al. | .......... 714/5 |

(Continued)

FOREIGN PATENT DOCUMENTS

JP 09-205402 8/1997

(Continued)

*Primary Examiner*—Khai Tran
(74) *Attorney, Agent, or Firm*—Cha & Reiter, LLC

(57) ABSTRACT

An asynchronous transport stream receiver of a digital broadcasting receiving system connected to MPEG-2 (Moving Picture Experts Group-2) equipment, such as a VOD (Video On Demand) server is disclosed. The inventive receiver includes an FIFO section for storing MPEG-2 data generated from DVB-ASI (Digital Video Broadcasting Asynchronous Serial Interface) signals, an oscillator for generating clock signals for producing the MPEG-2 data from the DVB-ASI signals, and a read controller for reading and outputting the MPEG-2 data stored at the FIFO section in synchronization with clock signals of the oscillator. Accordingly, the MPEG-2 data can be processed and outputted regardless of the SD or HD leveled compression condition (bit rate) of the MPEG-2 data transmitted according to the DVB-ASI standard.

14 Claims, 4 Drawing Sheets

U.S. PATENT DOCUMENTS

2003/0052709 A1* 3/2003 Venkata et al. ............... 326/37
2004/0234019 A1* 11/2004 Kim et al. .................. 375/372

FOREIGN PATENT DOCUMENTS

| | | |
|---|---|---|
| JP | 10-032552 | 2/1998 |
| JP | 2001-084265 | 3/2001 |
| JP | 2001-251266 | 9/2001 |
| JP | 2002-084265 | 3/2002 |
| JP | 2002-111504 | 4/2002 |
| JP | 2003-510912 | 3/2003 |

* cited by examiner

ASYNCHRONOUS TRANSPORT STREAM RECEIVER OF DIGITAL BROADCASTING RECEIVING SYSTEM EMPLOYING DVB-ASI MODE AND METHOD FOR TRANSMITTING ASYNCHRONOUS TRANSPORT STREAM THEREOF

CLAIM OF PRIORITY

This application claims priority to an application entitled "Asynchronous Transport Stream Receiver of Digital Broadcasting Receiving System Employing DVB-ASI Mode and Method for Transmitting Asynchronous Transport Stream thereof," filed in the Korean Intellectual Property Office on May 21, 2003 and assigned Serial No. 2003-32345, the contents of which are hereby incorporated by reference.

BACKGROUND OF THE INVENTION

1. Field of the Invention

The present invention relates to a digital broadcasting receiving system connected to an MPEG-2 (Moving Picture Experts Group-2) equipment, such as a VOD (Video On Demand) server, having different data transmission rates, and more particularly to an asynchronous transport receiver used in a digital broadcasting receiving system based on a DVB-ASI (Digital Video Broadcasting Asynchronous Serial Interface) mode and its related method of transmitting asynchronous transport stream of the receiver.

2. Description of the Related Art

The standards for the serial transmission of a transport stream between various types of broadcasting equipments associated with the digital television broadcasting in a synchronous or asynchronous mode includes, for example, a SMPTE 310 (Society of Motion Picture and Television Engineers 310) mode, which is preferred in domains belonging to ATSC (Advanced Television System Committee), and a DVB-ASI (Digital Video Broadcasting-Asynchronous Serial Interface) mode, which is favored in domains provided with DVB (Digital Video Broadcasting) services.

FIG. 1 is a block diagram showing the construction of a transport stream receiver based on the conventional DVB-ASI mode. As shown, the conventional stream receiver includes a serial/parallel converter 10, an output FIFO (First-In First-Out) section 16, a synchronization sensor 11, a frame producer 12, a frame controlling and clock synchronizing section 13, a 27 MHz oscillator 14, and a 10-bit/8-bit converter 15.

In operation, the serial/parallel converter 10 converts serial 10-bit data inputted from the outside source into corresponding parallel 10-bit data. The synchronization sensor 11 senses a K28.5 synchronous byte from the converted 10-bit data. The K28.5 synchronous byte is stuffing datum that is inserted for the synchronization. The frame producer 12 reconstructs a frame from the parallel 10-bit data based on the detection of the K28.5 synchronous byte.

Meanwhile, the frame controlling and clock synchronizing section 13 controls the frame producer 12 for the synchronization using the clock signals of the 27 MHz oscillator 14. The 10-bit/8-bit converter 15 then converts the parallel 10-bit data into parallel 8-bit data, so that MPEG-2 data are outputted at the same line together with stuffing characters. Valid signals are generated and used to distinguish the MPEG-2 data from the stuffing characters. For instance, it is recognized that the MPEG-2 data is outputted when the valid signals are in a low state, but the stuffing characters are outputted when the valid signals are in a high state.

Note that when 270 MBaud serial data is converted into parallel data by the serial/parallel converter 10, the 270 MBaud serial data is converted into 27 MB/sec parallel data. Among the 27 MB/sec data outputted, the actual pure data are outputted at about 20 Mbps or less, except for the datum (K28.5 synchronous byte) that is actually subjected to the stuffing for synchronization. Accordingly, the output FIFO section 16 functions as a buffer for decreasing and outputting only the pure data components at about 6 Mbps or less through the removal of the K28.5 synchronous byte.

However, the conventional DVB-ASI transport stream receiver as described in the preceding paragraphs can only process the data in which the bit rate is less than about 20 Mbps. Therefore, when a high quality of image data, which belong to the level of high definition (HD), in particular in the bit rate of 50 Mbps or more, is to be outputted, it is necessary to provide an additional high frequency clock generator and a control circuit for controlling the clock generator. Thus, the conventional receiver has a disadvantage in that its construction becomes complicated.

SUMMARY OF THE INVENTION

Accordingly, the present invention has been made to solve the above-mentioned problems occurring in the prior art and to provide additional advantages, by providing an asynchronous transport stream receiver capable of processing and generating MPEG-2 (Moving Picture Experts Group-2) data regardless of the SD or HD leveled compression condition (bit rate) of the MPEG-2 data that is transmitted according to the DVB-ASI (Digital Video Broadcasting Asynchronous Serial Interface) standard, as well as its related method for transmitting such an asynchronous transport stream.

According to one aspect of the present invention, an asynchronous transport stream receiver of a digital broadcasting receiving system connected to an MPEG-2 equipment, such as a VOD (Video On Demand) server, is provided. The receiver having different data transmission rates includes: an FIFO section for storing MPEG-2 data generated from a DVB-ASI signal; an oscillator for generating clock signals for producing the MPEG-2 data from the DVB-ASI signal; and a read controller for reading and outputting the MPEG-2 data stored in the FIFO section in synchronization with the clock signals of the oscillator.

According to another aspect of the present invention, a method for transmitting an asynchronous transport stream of a digital broadcasting receiving system is provided. First, it is checked whether a flag signal indicating that the MPEG-2 data is stored at the FIFO section in a predetermined size is outputted, and the MPEG-2 data from the FIFO section in synchronization with the clock signals of the oscillator is read to output the MPEG-2 data when the flag signal is outputted. The sync byte from the read MPEG-2 data is then detected and valid signals of the MPEG-2 data is generated when sync byte is detected.

BRIEF DESCRIPTION OF THE DRAWINGS

The above features and advantages of the present invention will become more apparent from the following detailed description taken in conjunction with the accompanying drawings, in which.

DETAILED DESCRIPTION OF THE PREFERRED EMBODIMENT

Hereinafter, a preferred embodiment of the present invention will be described in detail with reference to the accompanying drawings. For the purposes of clarity and simplicity, a detailed description of known functions and configurations incorporated herein will be omitted as it may make the subject matter of the present invention unclear.

Figure 2:
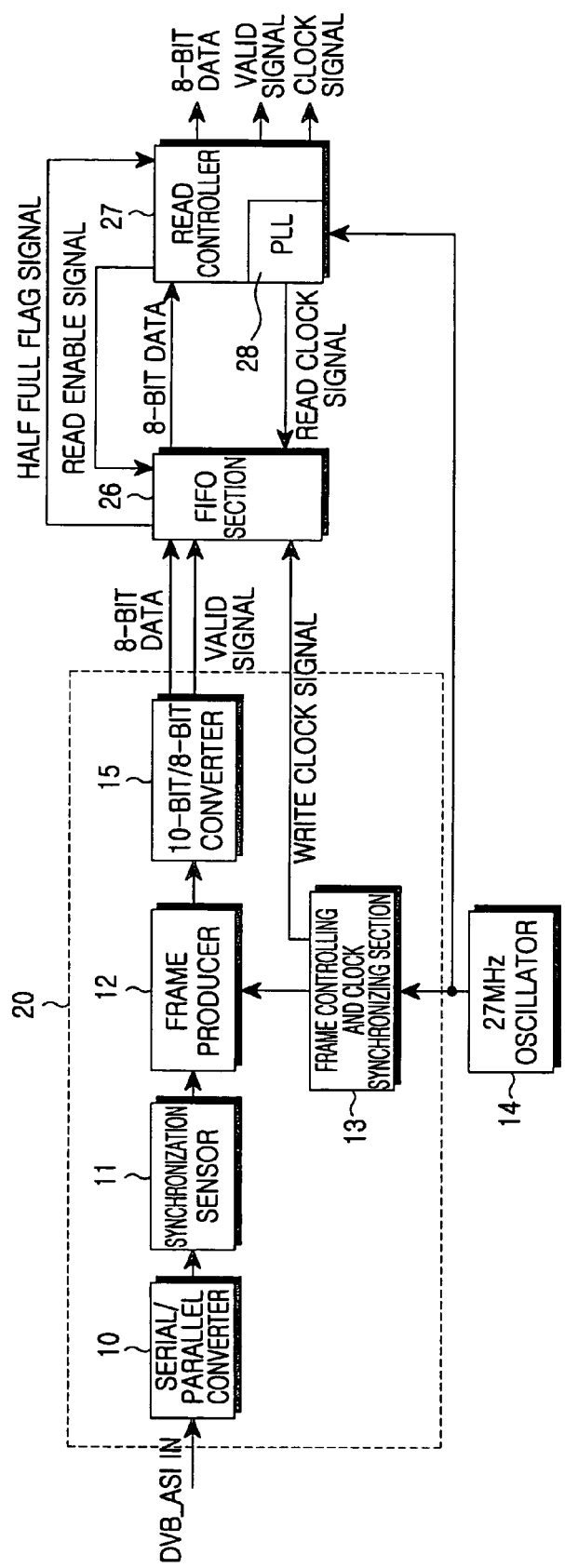
FIG. 2 is a block diagram of a transport stream receiver based on a DVB-ASI mode in accordance with the present invention.

FIG. 2 is a block diagram of a transport stream receiver configured to operate based on a DVB-ASI (Digital Video Broadcasting Asynchronous Serial Interface) mode in accordance with the present invention. The asynchronous transport stream receiver according the embodiment of the present invention includes a serial/parallel converter 10, a synchronization sensor 11, a frame producer 12, a frame controlling and clock synchronizing section 13, an oscillator 14, a 10-bit/8-bit converter 15, a FIFO (First-In First-Out) section 26 for storing 8-bit MPEG-2 data outputted from the 10-bit/8-bit converter 15, and a FPGA (Field Programmable Gate Array) 27 for controlling the FIFO section 26.

Figure 1:
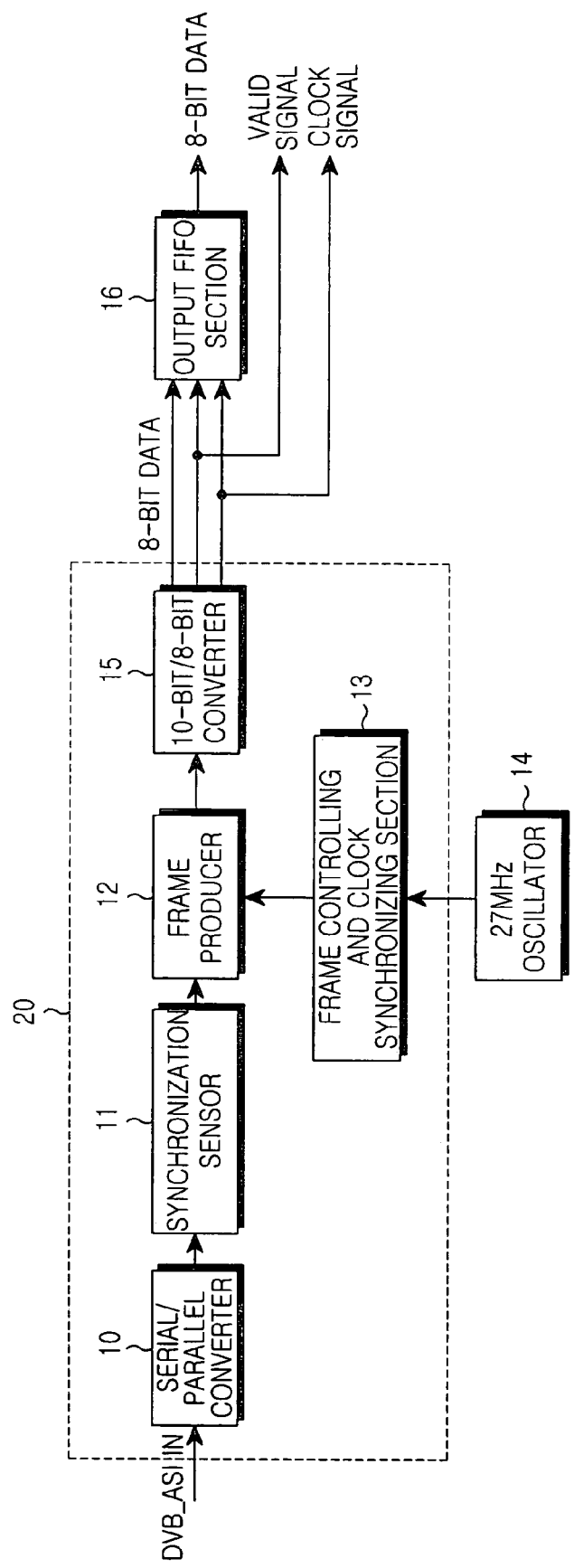
FIG. 1 is a block diagram showing the construction of a transport stream receiver according to a conventional DVB-ASI mode.

As shown in FIG. 1, the DVB-ASI MPEG-2 data inputted into the serial/parallel converter 10 represent serial broadcasting standard signals, which are transmitted at a bit rate of 270 MBaud in a physical layer. The serial/parallel converter 10 converts the 10-bit serial data into corresponding 10-bit parallel data. The synchronization sensor 11 looks for synchronization by detecting a K28.5 synchronous byte from the 10-bit parallel data received from the serial/parallel converter 10. Note that the K28.5 synchronous byte is inserted to synchronize the MPEG-2 data with the 27 MHz clock signals extracted from a DVB-ASI stream to prevent the loss of the clock signals when the MPEG-2 data are not present.

Further, the K28.5 synchronous byte serves the function of determining the position of actual data that begin within the serial data stream. A frame producer 12 reconstructs a frame with respect to the parallel 10-bit data with the aid of the frame controlling and clock synchronization section 13, which controls the frame producer 12 for the synchronization with the clock signals of a 27 MHz oscillator 14. The frame controlling and clock synchronizing section 13 has a built-in PLL (Phase Locked Loop). By using the PLL, the MPEG-2 data become in phase with the clock signals inputted from the 27 MHz oscillator 14.

The 10-bit/8-bit converter 15 converts the parallel 10-bit data into the corresponding original 8-bit MPEG-2 data according to a 10-bit/8-bit decoding table, which is pre-stored at the 10-bit/8-bit converter. The 10-bit/8-bit converter 15 outputs the 8-bit MPEG-2 data and stuffing characters for transmission through the same line, and as a result, valid signals to distinguish the 8-bit MPEG-2 data from the stuffing characters are produced.

Meanwhile, the FIFO section 26 functions to extract and store only the MPEG-2 data from the data outputted from the 10-bit/8-bit converter 15 by removal of the K28.5 synchronous byte. The FPGA 27 checks the state of the FIFO section 26. To this end, the FPGA 27 reads and processes the MPEG-2 data from the FIFO section 26, and then outputs the MPEG-2 data to an SD or HD leveled MPEG-2 decoder of, for example, a set-top box provided on the output end of the FPGA 27. The bit rate of the MPEG-2 data outputted from the FPGA 27 is determined by the clock signals when the FPGA 27 reads the MPEG-2 data from the FIFO section 26. In the embodiment, the PLL 28 or DLL (Delay-Looked Loop) incorporated into the FPGA 27 is used to read in and output the MPEG-2 data by dividing the clock signals of the 27 MHz oscillator as well as by synchronizing with the divided clock signals, as explained hereinafter. Note that the description will be made regarding only the case of the PLL being built in the FPGA 27 for simplicity, but it should be noted that the same principle applies when DLL may be incorporated in the FPGA 27.

Figure 3:
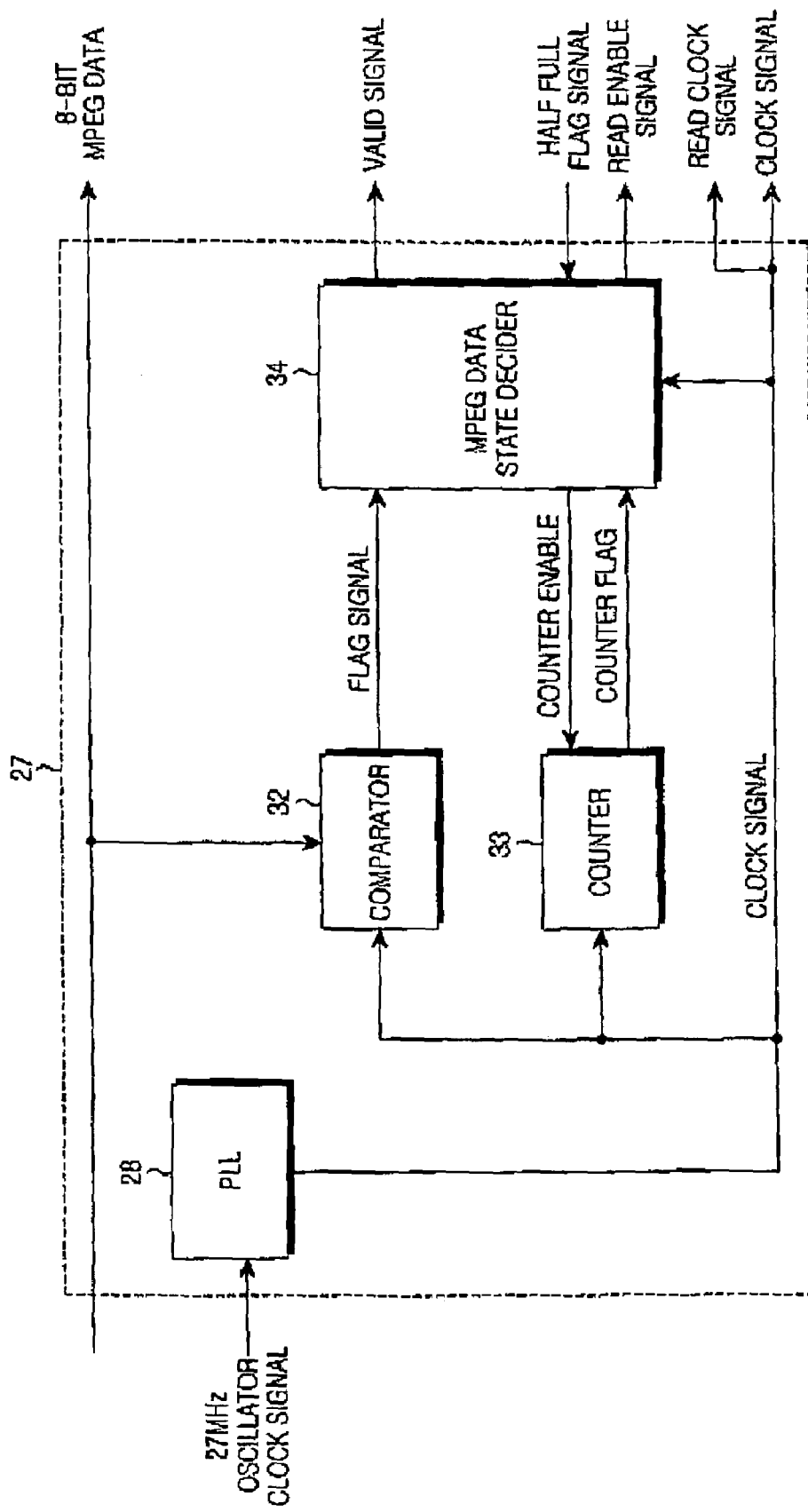
FIG. 3 is an internal block diagram of the FPGA 27 of the DVB-ASI mode transport stream receiver of FIG. 2.

FIG. 3 is an internal block diagram of the FPGA 27 of the DVB-ASI mode transport stream receiver shown in FIG. 2. As shown, the FPGA 27 includes the PLL 28 for generating clock signals for reading in the MPEG-2 data from the FIFO section 26 by dividing the clock signals of the 27 MHz oscillator 14 and by synchronizing with the divided clock signals, a comparator 32 for detecting 0×47 sync byte, a counter 33 for counting the MPEG-2 data in terms of one unit of 188 bytes, and the MPEG-2 data state decider 34 for deciding the state of the MPEG-2 data outputted from the FIFO section 26 and for generating control signals for controlling the FIFO section 26. Here, the 0×47 sync byte are attached as a unit packet of 188 bytes and serves to indicate the start point of a TS packet.

According to the standards of an MPEG-2 system, the MP-HL (Main Profile High Level), the ATSC (Advanced Television System Committee) standard, the upper bound of an MPEG-2 bit rate is 80 Mbps. In order to allow the MPEG-2 data to be outputted at the bit rate of up to 72 Mbps in the present invention, the PLL 28 may be utilized at the FPGA 27 as follows. The clock signals of the 27 MHz oscillator 14 are inputted into the PLL 28 of the FPGA 27, and then when the clock signals are divided three times, the clock signals of 9 MHz can be obtained. When these 9 MHz clock signals are used as read clock signals, the FPGA 27 is then capable of reading and processing the MPEG-2 data of up to maximum 72 Mbps from the FIFO section 26. Further, the FPGA 27 matches the read MPEG-2 data with the clock signals divided at the PLL 28, and then transmits the matched results to the set-top box (not shown). Meanwhile, when the clock signals of the 27 MHz oscillator are divided 10/27 times, clock signals of 10 MHz can be obtained. Additionally, the MPEG-2 data can be outputted at the bit rate of 80 Mbps, matching the upper bound of the MPEG-2 data of the MP-HL.

Referring back to FIG. 3, the FIFO section 26 stores 8-bit data provided from the 10-bit/8-bit converter 15 and outputs a flag signal indicating the quantity of the stored data. The flag signal shows whether or not the data is recorded in the FIFO section 26. In particular, the FIFO section 26 outputs an HF (Half Full) flag signal to indicate that the data is half-filled, thereby causing the FPGA 27 to initiate to read the MPEG-2 data.

When the HF flag signal is outputted from the FIFO section 26, the MPEG-2 data state decider 34 of the FPGA 27 outputs a read enable signal to start reading the data in the FIFO section 26. The FPGA 27 reads the data in the FIFO section 26 in synchronization with the 9 MHz read clock signals that are divided three times at the PLL 28. The comparator 32 of the FPGA 27 verifies whether or not the Ox47 byte is detected by checking the MPEG-2 data in the FIFO section 26. If the Ox47 byte is detected, the MPEG-2 data state decider 34 operates the counter 33 to verify whether or not the detected Ox47 byte are synchronization data by checking the MPEG-2 data of 188 bytes again. Note that synchronization data must be corrected into sync byte. According to MPEG Standard, MPEG TS packet has 188 bytes and first 4 bytes is overhead notifying information of the packet. The first byte of 4 bytes is named as sync byte. It's value is Ox47, and it notifies of the beginning of packet. For determining whether 0x47 detected in the packet is sync byte, the MPEG TS packet again checks other 188 bytes for existence of 0x47 and determines whether it is sync byte, since 0x47 can be in a payload receiving real information of voice/video data. After checking, if the 0x47 byte are determined to be the sync byte, the MPEG-2 data state decider 34 outputs valid signals of the MPEG-2 data.

Here, according to the MPEG-2 standard, a packet unit of the MPEG-2 data is 188 bytes. Therefore, the MPEG-2 data state decider 34 of the FPGA 27 checks for the 0x47 sync byte by checking the MPEG-2 data in terms of a packet unit of 188 bytes using the counter 33. This is necessary as the MPEG-2 data is made of packets, each of which is made up of 188 bytes and has the 0x47 sync byte. Thus, it is preferred that the MPEG-2 data state decider 34 checks the 0x47 sync byte of the MPEG-2 data at least twice. When the FPGA 27 checks that the 0x47 sync byte are inputted more than two times, the FPGA 27 then recognizes the input data as the MPEG-2 data and outputs the valid signals of the MPEG-2 data to the decoder of the set-top box, which is connected to the output side of the FPGA 27.

Figure 4:
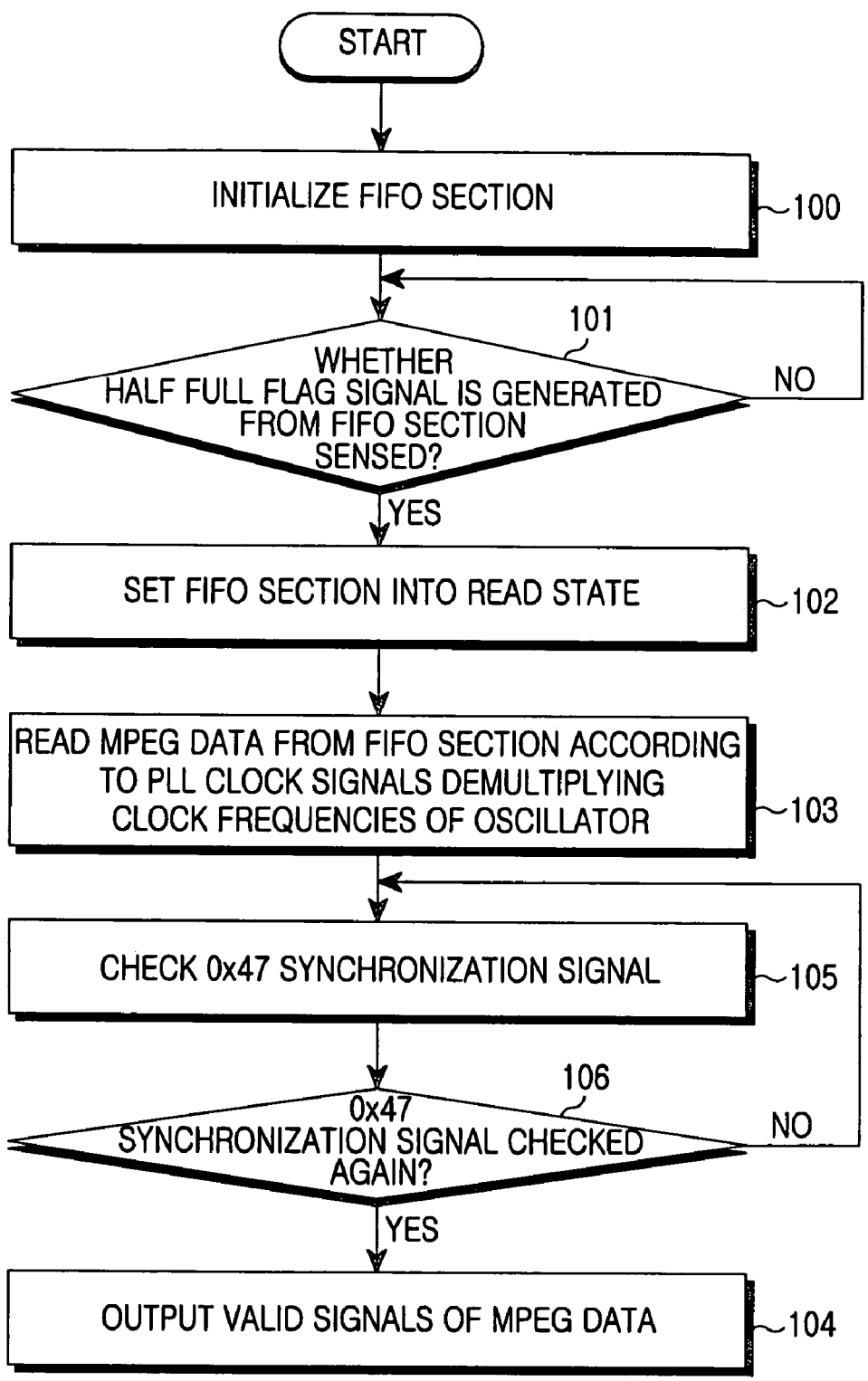
FIG. 4 is a flow chart illustrating the transmission of the MPEG-2 data according to the FPGA 27 of FIG. 2.

FIG. 4 is a flow chart for processing the transmission of MPEG-2 data of the FPGA 27 shown in FIG. 2. As shown in FIG. 4, the MPEG-2 data state decider 34 resets the FIFO section 26 (step 100). The FPGA 27 detects whether the HF (Half Full) flag signal is generated from the FIFO section 26 (step 101). If the flag signal is detected in step 101, the read enable signal is outputted and the FIFO section 26 is set to a read state (step 102). Then, the MPEG-2 data stored in the FIFO section 26 starts to be retrieved, and the FPGA 27 reads and outputs the MPEG-2 data from the FIFO section 26 according to the clock signals divided at the PLL 28 (step 103). The 0x47 sync byte included in the MPEG-2 data is checked twice in succession (step 105), which is done to check and sense the 0x47 sync byte. As a result of the sensed step in step 105, if the 0x47 sync byte is checked (step 106), the valid signals of the MPEG-2 data is outputted; thus, the decoder in the set-top box connected to the FPGA 27 is adapted to recognize the MPEG-2 data.

In this manner, the FPGA 27 outputs the clock signals, which are divided from the clock signals of the 27 MHz oscillator through the PLL 28 built in the FPGA, to read clock signals, then reads in and outputs the MPEG-2 data from the FIFO section 26 in which the MPEG-2 data are stored temporarily. Therefore, regardless of the compression condition (SD or HD level) of the inputted MPEG-2 data, the FPGA 27 can output the MPEG-2 data having the bit rate capable of being processed at the SD or HD leveled decoder. Note that the decoder is typically provided in a set-top box connected to the output end of the transport stream receiver, which is operating based on the DVB-ASI mode. As a result, a control logic of an algorithm for using the read clock signals through dividing the clock signals of the 27 MHz oscillator, is incorporated in the FPGA with the built-in PLL or DLL, thus eliminating the need of an additional clock generator. Moreover, the MPEG-2 data can be outputted at the bit rate at which the HD leveled decoder can process, for example, up to 72 Mbps or 80 Mbps. That is, the HD leveled MPEG-2 decoder in the set-top box connected to the FPGA 27 according to the teachings of the present invention is able to process the MPEG-2 data having the bit rate capable of being processed by the SD leveled decoder, including a bit rate faster than 15 Mbps.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. An asynchronous transport stream receiver of a digital broadcasting receiving system comprising:

a FIFO (First-In First-Out) section for storing MPEG data generated based on a DVB-ASI (Digital Video Broadcasting Asynchronous Serial Interface) mode;

an oscillator for generating clock signals;

a controller for reading and outputting the MPEG data stored in the FIFO section in synchronization with the clock signals of the oscillator, the controller including a PLL (Phase Locked Loop) or DLL (Dynamic Linking Library) for demultiplying the clock signals of the oscillator;

wherein said controller outputting the MPEG data stored in the FIFO section in synchronization with the clock signals of the oscillator is to a standard-definition (SD) or high-definition (HD) leveled MPEG decoder for a subsequent processing without requiring an additional clock generator.

2. The receiver according to claim 1, wherein the controller is operative to demultiply the clock signals of the oscillator by a predetermined times and is synchronized with the demultiplied clock signals.

3. The receiver according to claim 1, wherein the controller further comprises a comparator for detecting a sync byte; a counter for counting the MPEG data in terms of a packet unit of 188 bytes; and an MPEG data state decider for deciding a state of the MPEG data outputted from the FIFO section.

4. The receiver according to claim 3, wherein the MPEG data state decider outputs valid signals of the MPEG data if a 0x47 byte detected by the comparator is the sync byte.

5. The receiver according to claim 4, wherein the counter is operative to check the MPEG data at least twice in terms of a packet unit of 188 bytes to ensure that a detected 0x47 byte is the sync byte.

6. The receiver according to claim 4, wherein the FIFO section generates a flag signal if the MPEG data stored therein is greater than a predetermined size.

7. The receiver according to claim 1, wherein the controller is an FPGA (Field Programmable Gate Array).

8. The receiver according to claim 1, wherein the controller outputs the MPEG data at a rate of up to about 72 Mbps.

9. The receiver according to claim 1, wherein the controller outputs the MPEG data at a bit rate of up to about 80 Mbps.

10. A method for transmitting an asynchronous transport stream of a digital broadcasting receiving system having an FIFO section for storing MPEG data generated based on a DVB-ASI (Digital Video Broadcasting Asynchronous Serial Interface) mode and an oscillator for generating clock signals, the method comprising the steps of:

detecting whether the MPEG data is stored in the FIFO section;

if detected, retrieving the MPEG data from the FIFO section in synchronization with the clock signals of the oscillator, demultiplying the clock signals of the oscillator by a predetermined number of times, and reading the MPEG data from the FIFO section in synchronization with the demultiplied clock signals;

detecting sync byte from the retrieved MPEG data;
generating valid signals indicative of the MPEG data when the sync byte is detected; and
forwarding the valid signals to a standard-definition (SD) or high-definition (HD) leveled MPEG decoder for a subsequent processing without requiring an additional clock generator.

11. The method according to claim 10, wherein the detecting step of sync byte sets the FIFO section into a read state.

12. The method according to claim 11, wherein the detecting step of sync byte comprises the sub-steps of:

detecting Ox47 byte from the MPEG data, and
checking whether the Ox47 byte is sync byte using a counter.

13. The method according to claim 10, wherein the signals indicative of MPEG data are forwarded at a bit rate of up to about 72 Mbps.

14. The method according to claim 10, wherein the signals indicative of MPEG data are forwarded at a bit rate of up to about 80 Mbps.

* * * * *